S. W. EKROOS.
FLEXIBLE SHAFT.
APPLICATION FILED APR. 3, 1914. RENEWED NOV. 22, 1915.
1,244,186.
Patented Oct. 23, 1917.
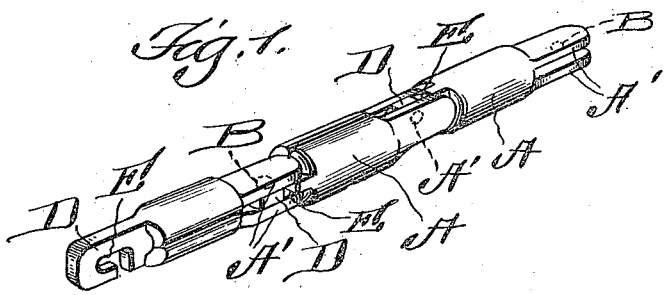
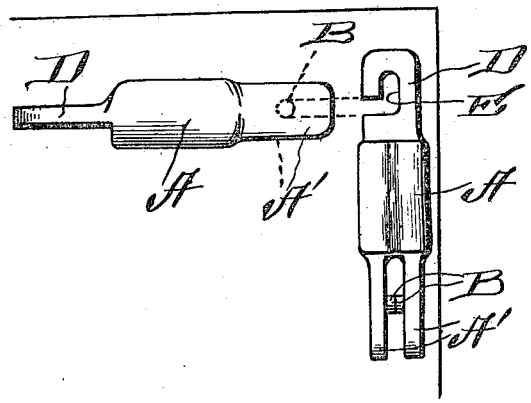
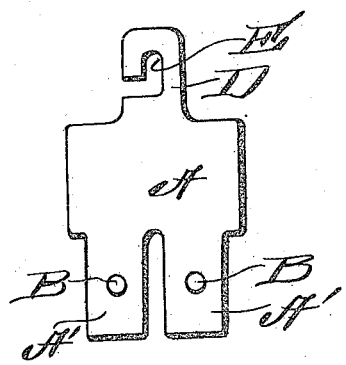
Inventor
Sigurd W. Ekroos,
Witnesses

UNITED STATES PATENT OFFICE.

SIGURD W. EKROOS, OF FLUSHING, NEW YORK, ASSIGNOR TO THE G. PILL COMPANY, INC., OF LONG ISLAND CITY, NEW YORK, A CORPORATION OF NEW YORK.

FLEXIBLE SHAFT.

1,244,186.     Specification of Letters Patent.     Patented Oct. 23, 1917.

Application filed April 3, 1914, Serial No. 829,264. Renewed November 22, 1915. Serial No. 62,886.

*To all whom it may concern:*

Be it known that I, SIGURD W. EKROOS, a subject of the Czar of Russia, residing at Maspeth, Flushing, L. I., in the county of Queens and State of New York, have invented certain new and useful Improvements in Flexible Shafts; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in flexible shafts and the object in view is to produce a simple and efficient device of this nature so constructed that the links of the shaft may be conveniently connected together and detached.

More specifically, the present invention consists of a series of links, each made of a flat blank of metal with struckup lugs which, when the plate is bent to form the link, are adapted to form a pivotal point for connection with the slot of an adjacent end of another link.

My invention comprises various details of construction, combinations and arrangements of parts which will be hereinafter fully described, shown in the accompanying drawings and then specifically defined in the appended claims.

I illustrate my invention in the accompanying drawings, in which:

Figure 1 is a perspective view of a flexible shaft made in accordance with my invention.

Fig. 2 is a side view showing the links of the chain separated, and

Fig. 3 is a detail view of one of the blanks cut to form a link and before being bent in the shape shown in the other views.

Reference now being had to the details of the drawings by letter, A designates a blank of metal which is stamped out with two wings A', and B designates a lug which is struck up from each wing. The opposite end of the blank has a contracted projecting part D with an angled slot E formed in one edge. The blank is bent so that the two wings A' will be positioned parallel to each other with a space intervening with the two lugs in contact with each other and forming pivotal means for engaging the angled slot at the contracted end of a similarly constructed link.

The body portion of the plate is preferably bent in cylindrical form with the two opposite edges in contact with each other as shown in the drawings. When the links have been thus formed, the lugs projecting from the adjacent faces of the wings A' are caught into the angled slot when the links are at right angles to each other and, when the wings are turned in alinement with one another, they will be locked together, the longitudinal movement of the link carrying the lugs which form the pivotal pin being limited by the ends of the wings coming in contact with the ends of the parts of the blank which are turned into cylindrical form, thus making it necessary to turn the links at right angles before they may be disconnected.

By the provision of a flexible shaft made in accordance with my invention, it will be noted that blanks which are stamped with the lugs integral therewith may bend to form the complete link, it merely being necessary to connect the same as shown to form the shank. By this construction, the links may be easily connected and disconnected when desired.

What I claim to be new is:

1. A flexible shaft comprising links, each made of a blank of metal having one end centrally slotted forming two wings, an integral lug struck up from the face of each wing, said lugs being adapted, when the wings are turned parallel to each other, to contact with each other and hold the wings spaced apart and forming a pivotal pin, the opposite end of the link having a contracted projection with an angled slot located along one edge thereof and forming a hook, said projecting portion designed to be positioned in the space intermediate the wings upon an adjacent link and the hook designed to engage the integral lugs thereon, the portion of the link intermediate said projection and lug-carrying wings adapted to be turned into cylindrical form, the ends of which serve as stops to limit the interlocked movement of the links.

2. As an article of manufacture, an element adapted to form part of a flexible shaft, said element comprising a one-piece sheet metal member having a hollow tubular center portion, an extension from one end of said tubular center portion designed to form a hook, a pair of wings projecting from the opposite end of said tubular center portion to form a space to contain a hook of a correspondingly shaped coacting member, and a projection extending from one of the wings toward the other and designed to engage the hook of said coacting member.

3. As an article of manufacture, a link adapted to form part of a flexible shaft, said link formed of one-piece sheet metal and including a hollow tubular center portion, a flat end member extending from one end of said center portion and provided with means for connecting the link to an adjacent link in the shaft, a pair of flat wings extending integrally from the opposite end of said center portion parallel to each other and designed to receive flatwise therebetween the flat end member of the next adjacent link therebetween, said wing end provided with connecting means to co-act with the connecting means of the next adjacent link.

4. As an article of manufacture, a link adapted to form part of a flexible shaft, said link formed completely of one-piece sheet metal and including a hollow tubular center portion, a flat end member extending from one end of said center portion and provided with means for connecting the link to an adjacent link in the shaft, a flat extension projecting from the opposite end of said tubular portion, said last named extension provided with means designed to be engaged by the flat-end-connecting means of the next adjacent link.

5. A sheet metal flexible shaft link including a tubular body portion with an extension projecting from one end thereof and provided with an angled slot located along one edge thereof and forming a hook, said body portion designed to constitute a stop to limit the interlocking of the link with a coacting element.

6. A one-piece sheet metal link adapted to form part of a flexible shaft, said link comprising a central tubular portion and a flat member extending from each of the ends of said central portion, one of said members positioned in a plane extending at an angle to the plane containing the other member, and each member provided with a complemental element of a pivotal connection and each element designed to constitute part of a pivotal connection with the next adjacent similar link when assembled to form a flexible shaft.

7. A one-piece sheet metal link adapted to form part of a flexible shaft, said link comprising a central portion and a flat member extending from each of the ends of said central portion, and each flat member provided with a complemental element of a pivotal connection, said elements being dissimilar and each element designed to constitute part of a pivotal connection with the next adjacent similar link when assembled to form a flexible shaft.

8. A flexible chain including two similar links, each formed of one piece of sheet metal and demountably fastened together to permit the separation of the same without distortion, one of said links including a pair of spaced apart flat end members and the other link including a flat end member fitting between said pair of end members to prevent relative rotary movement between said links, and a pivotal connection between said flat member and said pair of flat members to permit relative movement of the links in one plane.

In testimony whereof I hereunto affix my signature in presence of two witnesses.

SIGURD W. EKROOS.

Witnesses:
YGALMAS ANDERSON,
C. WM. CHAMBERLAIN.

Copies of this patent may be obtained for five cents each, by addressing the "Commissioner of Patents, Washington, D. C."

It is hereby certified that the assignee in Letters Patent No. 1,244,186, granted October 23, 1917, upon the application of Sigurd W. Ekroos, of Flushing, New York, for an improvement in "Flexible Shafts," was erroneously described and specified as "The G. Pill Company, Inc.," whereas said assignee should have been described and specified as *The G. Piel Company, Inc.*, as shown by the records of assignments in this office; and that the said Letters Patent should be read with this correction therein that the same may conform to the record of the case in the Patent Office.

Signed and sealed this 20th day of August, A. D., 1918.

[SEAL.]

Cl. 64—30.

F. W. H. CLAY,
*Acting Commissioner of Patents.*